United States Patent [19]

Richards et al.

[11] Patent Number: 5,336,720

[45] Date of Patent: Aug. 9, 1994

[54] IMPACT RESISTANT POLYMERS

[75] Inventors: Susanna E. Richards, Chalfont, Pa.; William L. Wills, Roebling, N.J.; Donna Wetzel, Bensalem; Anibal Rosado, Bristol, both of Pa.

[73] Assignee: Rohm and Haas Company, Philadelphia, Pa.

[21] Appl. No.: 710,496

[22] Filed: Jun. 5, 1991

[51] Int. Cl.$^5$ .............................................. C08L 33/02
[52] U.S. Cl. ........................................ 525/78; 525/63; 525/70; 525/79; 525/193; 525/221; 525/228; 525/232; 525/301
[58] Field of Search ............... 525/193, 70, 63, 78, 525/79, 221, 228, 232, 301

[56] References Cited

U.S. PATENT DOCUMENTS

| | | |
|---|---|---|
| 3,944,630 | 3/1976 | Ide et al. . |
| 4,041,108 | 8/1977 | Shoji et al. . |
| 4,419,496 | 12/1983 | Henton et al. . |
| 4,421,875 | 12/1983 | McKee et al. . |
| 4,427,836 | 1/1984 | Kowalski et al. . |
| 4,468,498 | 8/1984 | Kowalski et al. . |
| 4,487,890 | 12/1984 | Kishida et al. ................. 525/193 |
| 4,487,890 | 12/1984 | Kishida et al. . |
| 4,513,111 | 4/1985 | Kishida et al. . |
| 4,556,692 | 12/1985 | Kishida et al. . |
| 4,767,803 | 8/1988 | Yasui et al. . |
| 5,294,659 | 3/1994 | Kidder ........................... 524/458 |

FOREIGN PATENT DOCUMENTS

| | | |
|---|---|---|
| 1056975 | 6/1979 | Canada . |
| 2432342 | 1/1975 | European Pat. Off. . |
| 2427960 | 6/1975 | European Pat. Off. . |
| 1469302 | 4/1977 | European Pat. Off. . |
| 146035 | 6/1985 | European Pat. Off. . |
| 342944 | 11/1989 | European Pat. Off. . |
| 406806 | 1/1991 | European Pat. Off. . |
| 433710 | 6/1991 | European Pat. Off. . |
| 134521 | 7/1989 | Japan . |

OTHER PUBLICATIONS

Colloid & Polymer Science 268:791-796 (1990), M. Okubo, K. Ichikawa, M. Tsujihiro and Y. He.
Makromol. Chem., Suppl. 10/11, 403-418 (1985).

Primary Examiner—John Kight, III
Assistant Examiner—John M. Cooney, Jr.
Attorney, Agent, or Firm—R. K. Graham; D. P. Frickey

[57] ABSTRACT

An impact resistant graft polymer and an emulsion polymerization process comprising: 1) an agglomerated rubber latex made from a rubber latex and a polymerized polymeric additive, and 2) a grafted polymer.

19 Claims, No Drawings

IMPACT RESISTANT POLYMERS

FIELD OF THE INVENTION

This invention relates to a novel impact resistant polymer composition and a novel process for producing a novel impact resistant polymer composition which can be used with thermoplastic resins.

BACKGROUND OF THE INVENTION

The method for obtaining an impact resistant polymer composition by introducing a rubber composition into a hard and brittle thermoplastic resin such as polystyrene, polymethyl methacrylate, styrene-acrylonitrile copolymer, polyvinyl chloride, polyester, polypropylene, polycarbonate, polyimides, or the like, and related blends thereof, has been well known for many years.

The object of this invention is impact resistant polymers and an emulsion polymerization process to produce the impact resistant polymers having industrial advantages.

An impact resistant polymer composition can be obtained by polymerizing a monomer such as styrene, acrylonitrile, methyl methacrylate or the like in the presence of a rubber latex, of which may be produced by emulsion polymerization. It is widely recognized that, in such cases, the particle diameter of the rubber particles greatly governs the impact resistance and processability of the final product, and it is well-known that in some resin matrices, a rubber having a large particle diameter gives improved impact resistance and processability, in comparison to rubbers having small particle diameters.

Accordingly, rubbers such as acrylonitrile/butadiene/styrene (ABS) resins having large particle diameters are a preferred component in impact resistant resins. Dispersed rubber particles found in latices produced by known emulsion polymerization processes generally have small particle sizes (e.g. 40 nanometer (nm.) to 150 nanometer (nm.)), and impact resistance usually cannot be achieved with rubbers having small particle diameters of 40 nm. to 150 nm. Therefore, various processes for producing rubber particles having large particle diameters have been devised and reported.

However, many known processes for producing large particle diameter rubbers have many drawbacks. If an impact resistant resin is produced by such processes, there appear various further disadvantages. Generally speaking, processes for producing large particle diameter rubbers can be classified into two groups. One process for producing rubber particles in the course of polymerization of rubber is known as the "grow-out mechanism", and the other is the process of agglomerating a rubber latex having small size particle by an after treatment, known as "microagglomeration".

The most serious defect of the method in which rubber particles are produced during polymerization is that an extremely long polymerization time is required to complete the polymerization (i.e. greater than 70 hours for particles greater than 300 nm.) For instance, in order to obtain a rubber latex containing rubber particles having a particle diameter of approximately 300 nm., it is necessary to continue the polymerization for 48 to 100 hours. On the other hand, if a rubber latex having a small particle diameter is after-treated to agglomerate the particles, the period of polymerization can be shortened to a great extent. It is extremely difficult to produce a rubber having a large particle diameter by this process. In addition, only a small weight fraction of rubber particles agglomerate. Production of a large particle diameter rubber by this process has always resulted in the formation of high levels of undesirable coagulum. Further, if such a rubber is used for production of an impact resistant graft polymer, the formation of a large amount of coagulum takes place in the course of graft polymerization. Examples of known after-treatment processes to agglomerate particles include: agglomeration by the use of acid, agglomeration by the use of salt, ammonia-soap method, freezing method, solvent treatment method, high pressure treatment method, and polymer colloidal addition method.

The most important disadvantage in the production of large diameter rubber particles and impact resistant polymers by these processes is that special apparatus and reagents needed for the agglomeration of rubber particles must be used. If an impact resistant polymer is produced from monomers and rubbers continuously, for economical advantages, a number of difficulties are encountered. Although no particular apparatus is necessary for agglomerating rubber particles by the addition of an acid or a salt, such an agglomeration process is grounded on a partial destruction of the latex emulsion and the concentration of the aqueous solution of acid or salt, additional velocity of acid or salt, and the speed of stirring, all of which exercise great influence upon the agglomeration behavior of particles. Usually the formation of excessively large particles (coagulum) cannot be prevented, and therefore, it is impossible to produce a rubber having a particle size of 300 nm. or more without formation of coagulum, even though rubbers having a particle size of about 200 nm. can be produced by such processes with relative ease. Further, the addition of the aqueous solution of acid or salt causes lowering of the solid concentration of latex which brings about a decrease in productivity.

SUMMARY OF THE INVENTION

This invention is directed to an impact resistant graft polymer composition comprising:

1) from about 60 to about 95 parts by weight or more (as weight of solid component) of an agglomerated rubber latex (C) having the following composition:
   (a) 100 parts by weight (as weight of solid component) of a synthetic rubber latex (A) having a particle distribution between about 60 nm. and about 200 nm., and a pH from about 8.0 to about 10.0; and
   (b) from about 0.1 to about 5.0 parts by weight (as weight of solid component) of a polymerized polymeric additive (B) having an average particle diameter of about 100 nm. to about 300 nm., and formed by polymerizing:
      (1) one or more monomer groups where at least one monomer group always contains at least 30% by weight of unsaturated carboxylic acid selected from acrylic acid, methacrylic acid, itaconic acid, acryloxypropionic acid, crotonic acid, and the like;
      (2) from about 5 to about 70% (by weight) of a least one alkyl acrylate having $C_1$–$C_{12}$ alkyl group (such as methyl methacrylate, hydroxyethyl methacrylate, butyl acrylate, and the like); and (3) up to 70% (by weight) of other copolymerizable monomer(s); and 2) from about 5 to about 40 parts by weight of a grafted polymer (D) formed by polymerizing:
   (a) 30% by weight or more of at least one monomer selected from styrene, acrylonitrile, methyl methacrylate, hydroxyethyl methacrylate, butyl acrylate, ethyl acrylate, and the like; and
   (b) 30% by weight or less of a vinyl monomer having $CH_2=C<$ copolymerizable therewith.

This invention is also for a process for producing an impact resistant graft polymer comprising:

1) emulsion polymerizing:
   (a) one or more monomer groups where at least one monomer group always contains at least 30% by weight of unsaturated carboxylic acid selected from acrylic acid, methacrylic acid, itaconic acid, acryloxypropionic acid, crotonic acid, and the like;
   (b) from about 5 to about 70% (by weight) of a least one alkyl acrylate having $C_1$-$C_{12}$ alkyl group (such as methyl methacrylate, hydroxyethyl methacrylate, butyl acrylate, and the like); and
   (c) up to 70% (by weight) of other copolymerizable monomer, to obtain a polymeric additive latex (B) having an average particle diameter of from about 100 nm. to about 300 nm.;

2) adding from about 0.1 to about 5.0 parts by weight (as weight of solid component) of the polymeric additive latex (B) to 100 parts by weight (as weight of solid component) of synthetic rubber latex (A) which has a pH of from about 8.0 to about 10.0, to form an agglomerated rubber latex (C) having a particle diameter ranging from about 200 nm. to about 1000 nm.; and 3) emulsion polymerizing:
   (a) from about 5 to about 40 parts by weight of grafted polymer (D) which comprises:
      (aa) 30% by weight or more of at least one monomer selected from styrene, acrylonitrile, methyl methacrylate, hydroxyethyl methacrylate, butyl acrylate, ethyl acrylate, and the like; and
      (bb) 30% by weight or less of a vinyl monomer having $CH_2=C<$ copolymerizable therewith, and
   (b) from about 60 to about 95 parts by weight or more (as weight of solid component) of the agglomerated rubber latex (C).

The compositions and processes of this invention are described below in more detail.

DETAILED DESCRIPTION OF THE INVENTION

Examples of the rubber component (A) include polybutadiene; copolymers comprising 50% by weight or more of 1,3-butadiene unit such as: butadiene-monoethylenically unsaturated aromatic monomer copolymers (for example, butadiene-styrene copolymer, butadiene-vinyltoluene copolymer and butadiene-alpha-methylstyrene copolymer), butadiene-unsaturated nitrile monomer copolymers (for example, butadiene-acrylonitrile copolymer and butadiene-methacrylonitrile copolymer), butadiene-(meth)acrylate copolymers (for example, butadiene-methyl (meth)acrylate copolymer, and butadiene-ethyl (meth)acrylate copolymers), butadiene-acrylic copolymer (for example, butadiene-n-butyl acrylate copolymer); terpolymers and multipolymers comprising 50% by weight or more of a butadiene unit; polychloroprene and polychloroprene copolymers; homopolymer and copolymers comprising 50% by weight or more of alkyl acrylate unit having $C_1$-$C_{12}$ alkyl group; and the like. $C_1$-$C_{12}$ alkyl groups include lower alkyls of from 1 to 12 carbon atoms, such as methyl, ethyl, propyl, butyl, pentyl, hexyl, heptyl, octyl, nonyl, decyl, undecyl, and the like; and branched chain alkyls of from 3 to 12 carbon atoms such as tert-butyl, 2,2-dimethylpropyl, 1-methylpropyl, sec-propyl, 1,2,2-tri-methylpropyl, 2-methylpropyl, 1,2-dimethyl-2-ethylbutyl, and the like. A preferred rubber component is a butadiene-styrene copolymer comprising from about 70 to about 95% by weight of butadiene and from about 5 to about 30% by weight of styrene. Crosslinkers, such as polyethylenically unsaturated monomers, for instance, butylene diacrylate, butylene dimethacrylate, trimethylolpropane trimethyl acrylate, di-vinyl benzene, tri-vinyl benzene, allyl methacrylate, and the like, may also be used, at levels of less than or equal to 4% by weight. The synthetic rubber component (A) may be obtained by known emulsion polymerization process. Catalysts and emulsifiers used in the polymerization are not particularly limited, and the mean particle diameter of the polymer or copolymer in the rubber component (A) latex is in the range of about 50–200 nm., and, preferably, 60–100 nm., more preferably, 70–90 nm., and most preferably about 75–90 nm. The emulsion polymerization process is generally conducted at a temperature in the range from about 40° C. to about 95° C., and may be made in the presence of a surfactant, such as salts of saturated fatty acids, n-alkyl sulfates, n-alkyl sulfonates, and alkylated disulfonated diaryl oxides, and exemplified is potassium oleate (e.g. 1–2% by weight of rubber component(A)). As an initiator, a redox couple may be used, such as dibutyl hydroperoxide and sodium formaldehyde sulfoxylate. Polymerization should be carried to about 97% or more after ten hours, and solids content should be between about 30 to about 40%. Polymerization should result in a synthetic rubber latex (A) having a fairly monodisperse particle distribution between about 60 to about 100 nm., and a pH of from about 8.0 to about 10.0.

The polymeric additive (B) comprising one or more of acrylic acid, methacrylic acid, itaconic acid, acryloxypropionic acid, or crotonic acid is used for the purpose of agglomerating the synthetic rubber latex. The acid residue-containing polymeric additive (B) should be a latex and should be agglomerated with a rubber latex. The acid residue-containing polymeric additive (B) may be comprised of a unsaturated carboxylic acid, preferably an alpha, beta-unsaturated carboxylic acid, and one or more alkyl acrylates. A preferred unsaturated carboxylic acid is methacrylic acid. Preferred alkyl methacrylates and alkyl acrylates include methyl methacrylate and butyl acrylate. However, it is possible to replace one half or less the amount of the alkyl acrylate in the polymeric additive (B) with other vinyl or diolefin monomers.

The unsaturated carboxylic acid is used in at least one monomer group at an amount of greater than 30% by weight, and preferably in the range of greater than 30% by weight to about 50% by weight. If the amount of carboxylic acid is less than 30% by weight, the agglomerating ability is diminished.

It is necessary that the acid residue-containing (or polymerized) polymer additive (B) used in this invention be a latex, of which can be obtained by polymerizing monomer groups comprising: 1) one or more monomer groups where at least one monomer group always contains at least 30% by weight of at least one unsatureated carboxylic acid, preferably from greater than 30% to about 50% by weight of at least one alpha, beta-unsaturated carboxylic acid selected from acrylic acid, methacrylic acid, itaconic acid, crotonic acid, acryloxypropionic acid, and the like; 2) from about 5.0 to about 70% by weight, and preferably from about 40 to about 60% by weight of at least one alkyl acrylate having $C_1$-$C_{12}$ alkyl, such as methyl methacrylate, hydroxyethyl methacrylate, butyl acrylate, and the like; and 3) from about 0.1 to about 70.0% by weight of other copolymerizable monomers. For example, "other copolymerizable monomers", can be unsaturated aromatic compounds such as styrene, alpha-methylstyrene and vinyltoluene; unsaturated nitrile compounds such as acrylonitrile and methacrylonitrile; alkyl methacrylates having $C_1$-$C_{12}$ alkyl group, such as butyl acrylate (BA) and hydroxyethyl methacrylate (HEMA); and diolefins such as butadiene. Crosslinkers or graftlinkers, such as ethylenically unsaturated esters (e.g. allyl methacrylate and methallyl methacrylate, 1,3-butylene glycol dimethacrylate, trimethyl glycol propane triacrylate, and the like), or other ethylenically unsaturated monomers (e.g. di-vinyl benzene and tri-vinyl benzene) may be used, at levels typically less than or equal to 2% by weight.

Polymerization adjuvants may be added during or subsequent to the polymerization reaction of the polymer additive (B), and may include, one or more of the following: surfactants; defoamers, such as Surfonyl TM 104E (distributed by Air Products & Chemicals Inc., P. O. Box 538, Allentown, Pa. 18105), and Nopco TM NXZ (distributed by Diamond Shamrock Chemicals Co., 350 Mt. Kemble Ave., Morristown, N.J. 07960), used at levels from about 0.001 to about 0.1% by weight based on the weight of the monomer mixture; leveling agents, such as Sag® Silicone Antifoam 47 (distributed by Union Carbide Corp., 39 Ridgebury Rd., Danbury, Conn. 06817), used at levels from about 0.001 to about 0.1% by weight of the monomer mixture; antioxidants for inhibiting or controlling polymerization or stabilizing the resulting polymer, such as Maroxol® 20 (distributed by Martin Mariettta Corp., Executive Plaza II, Hunt Valley, Md. 21030) and Irganox 1010 (distributed by Ciba-Geigy Corp., 3 Skyline Drive, Hawthorne, N.Y. 10532), used at levels from about 0.01 to about 1.0% by weight of monomer mixture; plasticizers, such as Flexol® (distributed by Union Carbide Corp.); emulsion stabilizers and protective colloids, such as polyacrylic acid polymers, hydroxyethyl cellulose, methyl cellulose, and polyvinyl alcohol; and preservatives, such as Kathon® LX (distributed by Rohm and Haas Company, Independence Mall West, Philadelphia, Pa. 19105) and Proxel® CRL (distributed by ICI Americas Inc., Wilmington, Del. 19897), used at levels of about 5 to about 250 parts per million (ppm) by weight of monomer mixture.

Among the monomer groups satisfying the above-mentioned conditions for a polymerized polymer additive (B), those comprising: 1) greater than 30% to about 50% by weight of methacrylic acid, 2) from about 40% to about 60% methyl methacrylate, and 3) from about 0.1% to about 10% by weight of butyl acrylate are particularly preferred. A preferred butyl acrylate is n-butyl acrylate.

As the emulsifier used in the production of acid residue-containing copolymer, anionic surfactants are particularly preferable, though nonionic surfactants can also be used. Surfactants can range from about 0.01% to about 2.0%, such as saturated fatty acids, n-alkyl sulfates, n-alkyl sulfonates, such as sodium n-alkylbenzene sulfonate, exemplified herein at 0.9%, and potassium oleate.

The particle diameter of the acid-residue-containing polymeric additive (B) exercises a great influence on the agglomerating ability. Particularly preferable particle diameters range from about 100 nm. to about 300 nm., and more preferable is from about 140 nm. to about 300 nm.

The pH of the acid residue-containing polymeric additive (B) ranges from about 2.0 to about 5.0, and preferably from about 2.5 to about 4.0.

The acid residue-containing polymeric additive (B) in the form of a latex is added to the synthetic rubber latex (A). This addition process may be reversed such that the synthetic rubber latex (A) may be added to the acid residue-containing (or polymerized) polymeric additive (B).

The amount of the added acid residue-containing copolymer latex (B) is from about 0.1 to about 5.0 parts by weight (as weight of solid component), particularly preferred is from about 0.1 to about 3.8 parts by weight per 100 parts by weight (as weight of solid component), more preferred is from about 0.3 to about 3 parts by weight per 100 parts by weight (as weight of solid component), and most preferred is from about 1.0 to about 2.0 parts by weight per 100 parts by weight (as weight of solid component) of synthetic rubber (A). A low mount of acid residue-containing copolymer additive (B) is preferred to avoid too many nucleation centers from being formed.

In practicing the agglomerating treatment of this invention, it is necessary to keep the pH value of synthetic rubber latex (A) at a value not smaller than about 8.0, and particularly in the range of about 8.0 to about 10.0. If the pH is lower than about 8.0, the efficiency of agglomeration is low when an acid residue-containing polymeric additive latex (B) is added, so that the composition constituting the object of this invention cannot be produced advantageously and efficiently. Adjustment of pH value of synthetic rubber latex (A) to 9 or higher may be carried out in the course of polymerizing the synthetic rubber or may be carried out before the agglomerating treatment.

The correct pH for agglomerating is very important, since it influences the surface potential of the polymeric additive. The sequence of addition is important, as is the rate of the polymeric additive (B) addition. A dropwise introduction of polymeric additive latex (B) is recommended, since faster rates of addition further the formation of coagulum. The polymeric additive latex (B) preferably should be added to the synthetic rubber latex (A), and the reverse is also possible.

Other variables that will influence the agglomeration performance are temperature (from about 30° to about 80° C. preferred, from about 55° to about 65° C. more preferred) and time. Generally, addition times of adding polymeric additive (B) latex to synthetic rubber (A) latex range from about 3 to about 60 minutes (preferably about 30 minutes), at a temperature of about 30° to about 80° C. (preferably about 60° C.). Thereafter, agglomerated particles ranging from about 200 nm. to about 1000 nm. are formed in several minutes (i.e. from about 3 to about 60 minutes) to several hours (i.e. from about 3 to about 6 hours), but preferably in about 30 minutes. If the addition of acid containing polymers is carried out at lower temperature (about 20°–40° C.), the mixture can subsequently be heated to about 60° C. (for up to about 15 minutes), and then cooled. It appears that this heating period of about 15 minutes has a significant effect on the increase in particle size of the agglomerated particles (C).

Under the above-identified conditions, the degree of agglomeration also depends on the amount of polymeric additive added. Evidence from transmission electron microscopy indicates that all polymeric additive (B) is consumed during the agglomeration process, and that the remaining unagglomerated rubber (A) depends on the amount of polymeric additive (B) added. When 2.5% polymeric additive (B) is added to the rubber (A), over 75% of all rubber particles are agglomerated, whereas less polymeric additive (B), such as 1.2% polymeric additive (B) can result in the agglomeration of 99% of the rubber particles, if suitable conditions are employed. A fairly narrow particle size distribution was obtained by Sedimentation Field Flow Fractionation (SF3). Therefore by adding only sufficient amounts of additive (B), all the rubber should be agglomerated (i.e. about 99% rubber agglomeration).

The synthetic rubber particles agglomerate around the polymeric additive and appear to coalesce partially and yield spheroidal shapes. The mean particle sizes of the agglomerated particles (C) can range from about 200 nm. to about 1000 nm., depending on the reaction conditions.

The agglomerated particles (C) can be grafted with an acrylate/methacrylate shell. Conventional emulsion polymerization techniques can be employed. The graft particles can be isolated by salt coagulation or spray drying. In the grafting stage, from about 5 to about 40 parts by weight of grafting monomer selected from: styrene, acrylonitrile, methyl methacrylate, hydroxyethyl methacrylate, butyl acrylate, ethyl acrylate, itaconic acid, methacrylic acid, or acryloxypropionic acid, is polymerized in the presence of 95–60 parts by weight of the agglomerated rubber latex (C), which has been subjected to agglomerating treatment in the above-mentioned manner, whereby the intended impact resistant polymer can be obtained. The monomer that may be grafted to the agglomerated rubber latex (C) is a grafting monomer having the following composition: 1) from about 25 to about 95% by weight or more of methyl methacrylate, styrene, butyl acrylate, hydroxyethyl methacrylate, and acrylonitrile, and 2) from about 5 to about 50% by weight of one or more monomer having $CH_2=<$ copolymerizable therewith, and 3) may also include unsaturated carboxylic acid, such as itaconic acid, methacrylic acid, and acryloxypropionic acid. Styrene alone, acrylonitrile alone, methyl methacrylate alone, hydroxyethyl methacrylate alone, or butyl acrylate alone may be used for grafting, and examples of the copolymerizable vinyl monomer having $CH_2=C<$ include unsaturated nitrile compounds such as styrene, alpha-methylstyrene, vinyltoluene and the like; unsaturated nitrile compounds such as acrylonitrile and methacrylonitrile; alkyl methacrylates having a $C_1$–$C_{12}$ alkyl group, such as butyl methacrylate, methyl methacrylate, hydroxyethyl methacrylate and the like; and alkyl acrylates having a $C_1$–$C_{12}$ alkyl group, such as butyl acrylate, ethyl acrylate, methyl acrylate, and the like.

The grafted polymer (D) may comprise a polymer formed from monomers mixtures such as a styrene-acrylonitrile monomer mixture, a styrene-acrylic ester monomer mixture, a methyl methacrylate-acrylonitrile monomer mixture, a methyl methacrylate-acrylic ester monomer mixture, an acrylonitrile-acrylic ester monomer mixture, and the like. Monomer mixtures prepared by mixing two or more of these monomers can also be used. The following monomers, alone or in combination are useful to form grafted polymers (D): methyl methacrylate, hydroxyethyl methacrylate, hydroxyethyl acrylate, ethyl acrylate, butyl acrylate, styrene, acrylonitrile, itaconic acid, methacrylic acid, acryloxypropionic acid, and the like. For example, a mixture comprising styrene, methyl methacrylate, and ethyl acrylate can be used. Further, a grafted polymer (D) may have the following composition: 1) from about 5 to about 30% by weight butyl acrylate or hydroxyethyl methacrylate, and 2) from about 70 to about 95% by weight methyl methacrylate. A preferred butyl acrylate is n-butyl acrylate.

In this emulsion graft polymerization, known emulsifiers and catalysts are usually employed, and their kinds and amounts are not particularly limited. Exemplified are potassium oleate and sodium n-alkylbenzene sulfonate.

If the content of the agglomerated rubber in the impact resistant graft polymer of this invention is less than 50% by weight, the graft polymer is low in impact resistance so that it has no practical value. If the content of agglomerated rubber is larger than 90% by weight, the impact resistant graft polymer is poor in flow property and processability, which is undesirable.

The invention may be a resin blended into said graft polymer containing no rubber, such a resin composition may have a high impact resistance. In this case, the content of agglomerated polymer in the base graft polymer may be out of the above-mentioned range of 50–90% by weight. Since a polymer containing no rubber may be usable in this case, such examples of agglomerated polymers include polystyrene, polymethyl methacrylate, polyvinyl chloride, polycarbonate, polyester, styrene-acrylonitrile, polyimide, polypropylene, and the like, and related blends thereof. In the present invention, polystyrene includes a homopolymer or copolymers comprising 50% by weight or more of a styrene unit; polymethyl methacrylate includes a homopolymer or copolymers comprising 50% by weight or more of a methyl methacrylate unit; polyvinyl chloride includes a homopolymer or copolymers comprising 50% by weight or more of a vinyl chloride unit; polycarbonate includes a homopolymer or copolymers comprising 50% by weight or more of a carbonate unit.

When the grafted polymer (D) is graft-polymerized with agglomerated rubber (C), the grafted polymer (D) may be added at once, or it may also be added in portions or continuously. It is also allowable to graft-polymerize each of the graft polymers (D) stepwise.

Into the impact resistant graft polymer thus obtained, known additives such as antioxidants, ultraviolet stabilizers, hindered amine light stabilizers, light stabilizers, lubricants, colorants, pigments, toners, fillers, fibers, flame retardants, impact modifiers, and the like may be incorporated.

The impact resistant graft polymers can be readily employed in a wide variety of polymer matrices to provide polymer products which have improved physical and mechanical properties, such as improved impact strength. The impact resistant graft polymers can be included in polymeric matrices such as nylon polymers, poly(hexamethylene adipamide) and related polyamides, poly(p-phenylene sulfides), polysulfones, polyarylates, polystyrene, poly(ether imides), polyimides, poly(glutanmides), poly(phenylene ethers), polycarbonates, polymethyl methacrylate, styrene-acrylonitrile copolymer, polyvinyl chloride, and polypropylene, and the like or mixtures thereof. Generally, the impact resistant graft polymer is blended with the polymeric matrix, which is then molded to form a polymer product that has improved physical and mechanical properties.

Polymeric matrices and blends thereof may contain other components which are well known in the art such as toners, lubricants, anti-oxidants, colorants, ultraviolet stabilizers, hindered amine light stabilizers, impact modifiers, pigments, fillers, fibers, flame retardants, and the like.

The polymeric products which incorporate the impact resistant graft polymers of the invention and polymer matrices, may be formed, as for example, by injection molding or extruding, into a variety of useful objects and articles such as transportation and automotive parts, computer housings, electrical and electronic parts, telecommunication parts, industrial machine parts, consumer products, power tool housings, food packaging, wire and cable jacketing, filaments, appliance handles and housings, tough films, and the like.

Examples of transportation parts include but are not limited to electrical connectors, wire jackets, emission canisters, light-duty gears for windshield wipers, speedometers, engine fans, radiator headers, brake and power-steering fluid reservoirs, valve covers, mirror housing, and fender extensions. Examples of electrical or electronic parts include but are not limited to plugs, connectors, coil forms, wiring devices, terminal block, and antenna-mounting devices. Examples of telecommunication parts include but are not limited to relays, fittings, and contact makers. Examples of industrial machine parts include but are not limited to hammer handles, moving machine parts, unlubricated gears, bearings, anti-friction parts, and a variety of uses in which snap fits, detents, or spring loading is required. Food and textile-processing equipment, pumps, valves, meters, agricultural and printing devices, business and vending machines, and a host of other industrial products all utilize nylons. Examples of consumer products include but are not limited to ski boots, ice and roller skate supports, racquet sports equipment, and bicycle wheels, kitchen utensils, toys, and photographic equipment, as well as as in a variety of other consumer applications. Examples of food packaging film uses include but are not limited to packaging for meats and cheeses and cooling and heating bags and pouches. Examples of filaments include but are not limited to brush bristles, fishing line, sewing thread and filter screens. These polymeric products are also useful for producing blow-molded articles such as bottles, fuel tanks, automotive bumpers, and the like. Other uses for these polymeric products include but are not limited to heat resistant and solvent resistant engineering thermoplastics, medical devices, and electrical insulators. They may be formed into sheet, film, rod, profile, molded, co-extruded, or complex parts by any known plastics processing technique, and can be painted, dyed, decorated, metallized, or coated with abrasion resistant coatings, and the like.

As compared with known thermoplastic resin compositions, the impact resistant graft polymer of this invention has the following advantages:

1. The steps from the polymerization of rubber to the polymerization of final graft polymer can be practiced in a continuous manner.
2. No special apparatus is necessitated for agglomeration (e.g. pressure vessels).
3. The agglomeration of rubber (i.e. from rubber (A) and polymeric additive (B)) can be practiced in a short period of time (i.e. from about 3 to about 60 minutes, to about 3 to about 6 hours), therefore raising the productivity.
4. The rubber agglomerating treatment does not necessitate the use of any special dispersant or emulsifier, therefore the process is economical.
5. The formation of macro-agglomerates (coagulum) is very slight during both the agglomerating treatment of the rubber and graft polymerization of the agglomerated rubber particles.
6. The agglomeration of the rubber (A) and the polymeric additive (B) results in a high percentage of the rubber particles (A) being agglomerated (e.g. 50-90%).
7. It is a rubber having a large particle diameter (i.e. approximately 300 nm.–1000 nm), which is difficult to obtain by usually known agglomeration processes, thus enabling one to easily obtain a graft polymer having very high impact strength.
8. Total preparation time for producing the impact resistant graft poymer is approximately 16–20 hours.

While the invention has been described and exemplified in great detail, alternative embodiments, examples, alterations and improvements should become apparent without departure from the spirit and scope of the invention.

It is believed that one skilled in the art can, using the preceding description, utilize the present invention to its fullest extent. The following preferred specific embodiments are, therefore, to be construed as merely illustrative, and not limitative of the disclosure in any way. In the following examples, all temperatures are set forth in degrees Celsius and all parts and percentages are by weight, and all "parts" and "%" mean "parts by weight" and "% by weight", respectively, unless otherwise indicated. Particle size determinations throughout were made by photon correlation spectroscopy.

EXAMPLE 1(A)

Preparation of Rubber Component (A)

To a steel vessel were charged 60.4 parts deionized water, 0.8 parts of a 15.7% aqueous solution of potassium oleate, and 1.1 parts of a 5% solution of tetrasodium pyrophosphate (TSPP). A vacuum was applied to the vessel for 20 minutes. A mixture of 9.6 parts of styrene, 0.1 parts of di-butylhydroperoxide, and 1.1 parts of deionized water was added. Divinyl benzene may also be added at this point if desired (i.e. see Summary of Examples: 2. Synthetic Rubber (A)). While agitating, 23.3 parts of butadiene were added. The reaction mixture was heated to about 45° C., while adding 0.2 parts of a 6% aqueous solution of sodium formaldehyde sulfoxylate. After 30 minutes, 0.3 parts of a solution containing the following components by weight were added:

96.30% deionized water;

2.75% sodium formaldehyde sulfoxylate;
0.55% Ethylenediaminetetraacetic acid tetrasodium salt (EDTA Na4);
0.07% Sodium Hydroxide (NaOH); and
0.35% $FeSO_4 \cdot 7H_2O$.

After 3.5 hours, or reaching 40–45% conversion, a mixture of 2.1 parts of a 15.6% aqueous potassium oleate solution, and 0.9 parts of deionized water was added. The polymerization process was then continued for another 6.5 hours. In the alternative, a butadiene/styrene/methyl methacrylate and divinyl benzene rubber emulsion may be prepared, if so, methyl methacrylate and divinyl benzene can be added at this point in time, and reacted for another three hours. After a total reaction time of 10 hours and a conversion of 97%, a rubber latex emulsion (A) was obtained with a composition of butadiene/styrene (71/29), a solids content of 33.4%, a particle size of 83 nm., and a pH of 9.5. Preparation time was approximately 10 hours. Preparation time for the alternative (i.e. butadiene/styrene/methyl methacylate and divinyl benzene rubber emulsion) would be approximately 13 hours.

EXAMPLE 1(B)

Preparation of Polymeric Additive (B)

50.7 parts deionized water were charged to a flask, and heated to 83° C., and sparged with nitrogen for 0.5 hour. The nitrogen flow was discontinued, and 0.09 parts of a 23% aqueous solution of sodium dodecyl benzene sulfonate (surfactant) and 0.86 parts deionized water were added. After 2 minutes and while agitating, 0.39 parts deionized water, were introduced into 9% of the following emulsified mixture:

11.86 parts deionized water;
0.12 parts 23% aqueous solution of sodium dodecyl benzene sulfonate (surfactant);
1.63 parts butyl acrylate;
16.75 parts methyl methacrylate; and
0.10 parts methacrylic acid.

The agitation was reduced, and 0.14 parts of sodium persulfate and 1.94 parts deionized water were added as a shot. After 5 minutes, 1.03 parts sodium dodecyl benzene sulfonate and 1.17 parts deionized water were blended into the remaining emulsified mixture along with an additional 10.68 parts methacrylic acid and 2.54 parts methyl methacrylate. The remaining emulsified mixture was added to the flask over approximately 2 hours and reacted further for 30 minutes. After 100% conversion, the emulsion had particles which were 165 nm. in size and had a pH of 2.56. Final composition of the polymeric additive is 5/61/34 (butyl acrylate/methyl methacrylate/methacrylic acid). Preparation time was approximately 3 hours.

EXAMPLE 1(C)

Preparation of Agglomerated Rubber Particles (C)

60 parts of rubber latex (A) and 31 parts deionized water were charged to a flask, agitated and heated to 80° C. Over a period of 10–30 minutes a solution of 1 part of Additive (B) and 4 parts deionized water was added dropwise, along with 1.6 parts 2.5% aqueous NaOH solution. The blended emulsions were agitated for an additional 10 minutes. Finally, 0.04 parts dioctyl sodium sulfosuccinate, 0.12 parts potassium oleate and 1.6 parts deionized water was introduced. The resultant mean particle diameter of the emulsion was 710 nm. Preparation time was approximately 1–2 hours.

EXAMPLE 1(D)

Alternative Method to Prepare Agglomerated Rubber Particles (C)

81.2 parts of rubber latex (A), 0.1 parts of disodium ethoxylated nonylphenol half ester of sulfosuccinic acid and 3.1 parts of deionized water were charged to a flask with stirring and heated to 65° C. 3.3 parts of Additive (B) and 10 parts deionized water were added over 30 minutes. The stirring rate was faster during the first 10 minutes of the addition period. An additional 10 minutes reaction time was allowed after the complete addition of (B). Finally, 1.6 parts 1% aqueous NaOH solution, 0.1 parts potassium oleate and 0.6 parts deionized water were added. Resultant mean particle diameter of the emulsion was 360 nm. Preparation time was approximately 1–2 hours.

EXAMPLE 1(E)

Alternative Method to Prepare Agglomerated Rubber Particles (C)

48.5 parts of rubber latex (A) and 0.5 parts of deionized water were charged to a flask and heated to 40° C. Over a period of 4 minutes, 12.5 parts of a 5% solution of (B) was added dropwise. The mixture was heated to 60°–65° C. After 5 minutes, 12.5 parts of water, and 0.6 parts of a 5% sodium hydroxide (NaOH) solution were added. The agitiation speed was increased and another 12.5 parts of deionized water was introduced. Finally, 0.4 parts of a 15.5% aqueous solution of potassium oleate was added. The particle size was determined to be 511 nm.

COMPARATIVE EXAMPLE 2(A)

Same as Example 1(B), except the polymeric additive (B) contained 6 parts methacrylic acid instead of 10.78, and 24.09 parts methyl methacrylate instead of 19.29. The agglomeration was conducted as in 1(C), except at 60° C. The final mean particle diameter of the emulsion was 170 nm.

COMPARATIVE EXAMPLE 2(B)

Same as Example 1(B) and 2(A), except the polymeric additive (B) contained zero (0) parts methacrylic acid. No agglomeration was observed.

COMPARATIVE EXAMPLE 2(C)

The rubber latex (A) was synthesized to have the following composition: Bd/St=95/5. Agglomeration as described in 1(c) except using 2 parts (B) and heating at 60° C. The resultant mean particle diameter in the emulsion was 545 nm. Sedimentation field flow fractionation indicated that 73% of the rubber latex (A) had agglomerated.

COMPARATIVE EXAMPLE 2(D)

A rubber latex (A) and a polymeric additive (B) having comparable sizes, 180 nm. and 160 nm., respectively, were combined according to Example 1(C), except the reaction was run at 60° C. Mean particle diameter of the final emulsion was 265 nm.

COMPARATIVE EXAMPLE 2(E)

Addition of polymeric additive (B) at a higher concentration, and as one shot, did not yield the same particle size and size distribution as a continuous dropwise addition, such as described in Examples 1(C) and 1(D).

EXAMPLE 3(A)

Grafting of Monomer Mixtures to Agglomerated Particles (C)

85 parts of rubber, prepared in a reaction like Example 1(A), having the composition: Bd/St=95/5, 21.1% solids, and agglomerated as in Example 1(C) to a final particle size of 480 nm., and 8.4 parts deionized water were sparged with nitrogen for 25 minutes and heated to 60° C. Then 0.09 parts of a mixture consisting of 99.5% deionized water, 0.33% ethylenediaminetetra-acetic acid (EDTA), and 0.002% of $FeSO_4$, and 0.07 parts of a 6% aqueous solution of sodium formaldehyde sulfoxylate were added. Over a period of 1 hour, 2.0 parts methyl methacrylate, 0.4 parts hydroxyethyl methacrylate (HEMA), and 0.10 parts cumyl hydroperoxide were added to the reaction flask. Then 1 part of deionized water, 0.078 parts of a 6% aqueous solution and 0.006 parts of cumyl hydroperoxide were added. The polymerization was carried to completion over a 30 minute period. Preparation time was approximately 2–3 hours.

EXAMPLE 3(B)

Grafting of Monomer Mixtures to Agglomerated Particles (C)

740.5 parts of rubber latex (A), agglomerated as in Example 1(D) to a final particle size of 430 nm., was added to a flask with stirring and heated to 60° C., 360 parts deionized water, 0.006 parts sodium ferric ethylene diaminetetraacetate, and 3.3 parts of a 6% aqueous solution of sodium formaldehyde sulfoxylate were then added. A mixture of 63 parts methyl methacrylate, 3 parts butyl acrylate, and 0.165 parts of t-butyl hydroperoxide was added dropwise over 60 minutes, and the contents of the flask were then allowed to react for another 15 minutes. Preparation time was approximately 2–3 hours.

EXAMPLE 4

Impact Strength Comparison a) Polyvinyl chloride resin containing approximately 7% grafted agglomerated rubber (e.g. rubber of Example 1(A), agglomerated to 300 nm. particle size and grafted, 85 parts agglomerated rubber and 15 parts styrene/methyl methacrylate/ethyl acrylate) had a mean energy absorption of 7 ft.lbs./in. at 10° C. under standard Notched Izod impact testing conditions (see ASTM D-256). Polyvinyl chloride resin without added grafted agglomerated rubber had a mean absorbed energy of <2 ft.lbs./in.

b) Polyvinyl chloride resin containing approximately 8% grafted agglomerated rubber (e.g. rubber particle sizes agglomerated to 300–500 nm. particle size) had a mean energy absorption of 10–11 ft.lbs./in. at 23° C. under standard Notched Izod impact testing conditions (see ASTM D-256). Polyvinyl chloride resin without the added grafted agglomerated rubber had a mean absorbed energy of <2 ft.lbs./in.

SUMMARY OF EXAMPLES

1. Ingredients
rubber (A)
polymeric acid-containing additive (B)
agglomerated particles (C)
grafted polymer particles (D).

2. Synthetic Rubber
The rubbers investigated had the following properties (composition/size/pH):

| | Composition (ratio: %) | Particle Size | pH |
|---|---|---|---|
| 1) | Bd/St = 71/29 | 83 nm. | 9.5 |
| 2) | 75/25 | 77 nm. | 9.5 |
| 3) | 75/25 | 180 nm. | 10.3 |
| 4) | 77/23 | 73 nm. | 9.5 |
| 5) | 77/23 + 1% DVB | 71 nm. | 8.9 |
| 6) | 77/23 + 1% DVB | 77 nm. | 9.5 |
| 7) | 77/23 + 2% DVB | 77 nm. | 9.5 |
| 8) | 95/5 | 77 nm. | 9.5 |
| 9) | Bd/St/MMA = 93/3/4 + 1% DVB | 95 nm. | 10.3 |

KEY:
Bd—butadiene
MMA—methyl methacrylate
DVB—divinylbenzene
St—styrene

3. Polymeric Additive (B)
The following compositions of the polymeric additive were investigated:

| BA/MMA/MAA (%) = | particle size = | pH = |
|---|---|---|
| 1) 5/45/50 | 168 nm. | 2.7 |
| 2) 5/61/34 | 165 nm. | 2.56 |
| 3) 5/57/38 | 150 nm. | 2.9 |
| 4) 5/76/19 | 133 nm. | 2.6 |
| 5) 5/95/0 | 128 nm. | 2.5 |
| 6) 5/57/38 | 264 nm. | 3.2 |
| 7) 42/28/30 | 105 nm. | 4.23 |
| 8) 42/24/34 | 90 nm. | 3.8 |

KEY:
BA—butyl acrylate
MMA—methyl methacrylate
MAA—methacrylic acid

4. Agglomerated Particles (C)=(Rubber (A) and Polymeric Additive (B)):

| | Parts Polymeric Additive (B)* | Agglomeration Procedure (Ex.) and Temperature (°C.) | Agglomerated Particle (C) Size |
|---|---|---|---|
| Composition (%) Rubber (A): Bd/St | | | |
| 1) 71/29 | 1.2 (#) | 1(C) & (60° C.) | 695 |
| 2) 71/29 | 1.9 (#) | 1(E) & (see 1(E)) | 681 |
| 3) 71/29 | 3.8 (#) | 1(E) & (see 1(E)) | 511 |
| 4) 77/23 | 0.6 (#) | 1(C) & (60° C.) | 330 |
| 5) 77/23 | 1.2 (#) | 1(C) & (80° C.) | 710 |
| 6) 95/5 | 1.27 (#) | 1(C) & (60° C.) | 647 |
| 7) 95/5 | 1.75 (#) | 1(C) & (60° C.) | 556 |
| 8) 95/5 | 1.75 (**) | 1(C) & (60° C.) | 167 |
| 9) 95/5 | 1.78 (#) | 1(C) & (60° C.) | 425 |
| 10) 95/5 | 2.4 (#) | 1(C) & (60° C.) | 565 |
| 11) 95/5 | 2.5 (**) | 1(C) & (60° C.) | 182 |

-continued

| | Parts Polymeric Additive (B)* | Agglomeration Procedure (Ex.) and Temperature (°C.) | Agglomerated Particle (C) Size |
|---|---|---|---|
| Composition (%) Rubber (A): (Bd/St/MMA + % DVB) | | | |
| 12) 92/3/4 + 1% | 0.35 (#) | 1(D) & (65° C.) | 360 |

KEY:
* = Parts per 100 parts of Rubber (A)
(#) = Composition is 5/57/38 (butyl acrylate/methyl methacrylate/methacrylic acid)
(**) = Composition is 5/76/19 (butyl acrylate/methyl methacrylate/methacrylic acid)
Ex. = see example 1(C), 1(D), or 1(E)
& = and 5. Grafting of Monomer Mixtures to Agglomerated Rubber Particles (C)

| Agglomerated Particles (C) % | Graft Monomer % | Ex. # | Monomers/Ratio | Total Ratio |
|---|---|---|---|---|
| 1) 90 (#) | 10 | 2 | MMA (100) | 100 |
| 2) 78 (#) | 22 | 6 | MMA/HEMA (93.2/6.8) | 78//20.5/1.5 |
| 3) 78 (#) | 22 | 6 | MMA/HEMA (77.3/22.7) | 78//17/5 |
| 4) 88 (#) | 12 | 11 | MMA/HEMA (81.3/18.7) | 88//9.8/2.2 |
| 5) 55 (#) | 45 | 5 | St/MMA/EA (50/40/10) | 55/22.5/18/4.5 |
| 6) 65 (#) | 35 | 4 | St/MMA/EA (50/25/25) | 65/17.5/8.75/8.75 |
| 7) 85 (#) | 15 | 13 | MMA/BA (95/5) | 85/14.25/0.75 |

KEY:
MMA—methyl methacrylate
HEMA—hydroxyethyl methacrylate
BA—butyl acrylate
St—styrene
EA—ethyl acrylate
(#) = composition is 5/57/38 (butyl acrylate/methyl methacrylate/methacrylic acid)
Ex. # = example numbers from the 4. Agglomerated Particles (C) example

We claim:
1. An impact resistant graft polymer composition comprising:
   from about 60 to about 95 parts by weight based on 100 parts of total graft copolymer composition of an agglomerated rubber (C) latex having the following composition:
   (a) 100 parts by weight based on the sum of the parts of synthetic rubber latex and polymeric additive, of a synthetic rubber latex (A) having a particle distribution between about 60 nm. and about 200 nm., and a pH from about 8.0 to about 10.0; and
   (b) from about 0.1 to about 5.0 parts by weight based on the sum of the parts of synthetic rubber latex and polymeric additive, of a polymerized polymeric additive (B) having an average particle diameter of about 100 nm. to about 300 nm., and formed by polymerizing:
      (1) at least 38% to about 90% by weight of at least one unsaturated carboxylic acid selected from acrylic acid, methacrylic acid, itaconic acid, acryloxypropionic acid, or crotonic acid;
      (2) from about 5 to 57% by weight of methyl methacrylate;
      (3) from 5 to 10% by weight of butyl acrylate; and
   2) from about 5 to about 40 parts by weight based on 100 parts of total graft copolymer composition of a grafted polymer (D) having the following composition:
      (a) at least 30% by weight of at least one monomer selected from styrene, acrylonitrile, methyl methacrylate, hydroxyethyl methacrylate, hydroxyethyl acrylate, butyl acrylate, ethyl acrylate, itaconic acid, methacrylic acid, or acryloxypropionic acid; and
      (b) less than 30% by weight of a vinyl monomer having $CH_2=C<$ copolymerizable therewith.

2. The impact resistant graft polymer of claim 1 wherein the agglomerated rubber (C) latex has particle diameters ranging from about 200 nm. to about 1000 nm.; the synthetic rubber (A) latex is polybutadiene, copolymers comprising 50% by weight or more of a 1,3-butadiene unit, terpolymers and multipolymers comprising 50% by weight or more of a butadiene unit, polychloroprene and polychloroprene copolymers or homopolymers of an alkyl acrylate having a $C_1$-$C_{12}$ alkyl group and copolymers comprising 50% by weight or more of an alkyl acrylate unit having a $C_1$-$C_{12}$ alkyl group; the polymerized polymeric additive (B) is a latex, and is comprised of an alpha, beta unsaturated carboxylic acid; and the grafted polymers (D) are selected from butyl acrylate, hydroxyethyl methacrylate, hydroxyethyl acrylate, methyl methacrylate, ethyl acrylate, acryloxypropionic acid, acrylonitrile, styrene, itaconic acid, or methacrylic acid.

3. A process for producing an impact resistant graft polymer comprising:
   1) emulsion polymerizing:
      (a) from at least 38% to about 90% by weight of unsaturated carboxylic acid selected from acrylic acid, methacrylic acid, itaconic acid, acryloxypropionic acid, or crotonic acid;
      (b) from about 5 to 57% by weight methyl methacrylate; and
      (c) from 5 up to 10% by weight of butyl acrylate, to obtain a polymeric additive latex additive (B) having an average particle diameter of from about 100 nm. to about 300 nm.;
   2) adding from about 0.1 to about 5.0 parts by weight (as weight of solid component) of said polymeric additive latex (B) to 100 parts by weight (as weight of solid component) of synthetic rubber latex (A) which has a pH of from about 8.0 to about 10.0, to form an agglomerated rubber latex (C) having a particle diameter ranging from about 200 nm. to about 1000 nm.; and 3) emulsion polymerizing:
   (a) from about 5 to about 40 parts by weight based on 100 parts of said impact-resistant grafted copolymer of grafted polymer (D) which comprises:
      (aa) at least 30% by weight of at least one monomer selected from styrene, acrylonitrile, methyl methacrylate, hydroxyethyl methacrylate, hydroxyethyl acrylate, butyl acrylate, or ethyl acrylate; and
      (bb) less than 30% by weight of a vinyl monomer having $CH_2=C<$ copolymerizable therewith, in the presence of
   (b) from about 60 to about 95 parts by weight (as weight of solid component) based on 100 parts of said impact-resistant graft copolymer of said agglomerated rubber latex (C).

4. The process of claim 3 wherein the synthetic rubber latex (A) is polybutadiene, copolymers comprising 50% by weight or more of a 1,3-butadiene unit, terpolymers of multipolymers comprising 50% by weight or more of a butadiene unit, polychloroprene and polychloroprene copolymers, homopolymers of an alkyl acrylate having a $C_1$-$C_{12}$ alkyl group or copolymers comprising 50% by weight or more of an alkyl acrylate unit having a $C_1$-$C_{12}$ alkyl group; the polymerized polymeric additive latex (B) is comprised of an alpha, beta, unsaturated carboxylic acid; and the grafted polymers (D) are selected from butyl acrylate, styrene, hydroxyethyl methacrylate, hydroxyethyl acrylate, ethyl acrylate, methyl methacrylate, acryloxypropionic acid, acrylonitrile, itaconic acid, methacrylic acid, or blends thereof.

5. The impact resistant graft copolymer of claim 2 wherein the synthetic rubber (A) latex is a butadiene-styrene copolymer comprised of from about 70 to about 95% by weight of butadiene, and from about 5 to about 30% by weight of styrene, and has a particle size distribution ranging from about 70 nm. to about 90 nm.

6. The impact resistant graft polymer of claim 5 wherein the polymeric additive (B) comprises from at least about 34 parts to about 50 parts by weight unsaturated carboxylic acid, from about 40 to about 60 parts by weight methyl methacrylate, and from about 0.1 to about 10 parts by weight butyl acrylate.

7. The impact resistant graft polymer of claim 6 wherein the polymerized polymeric additive (B) latex further comprises about 0.1 to about 10.0 parts by weight of other copolymerizable monomers.

8. The impact resistant graft polymer of claim 6 wherein the polymerized polymeric additive (B) latex comprises from about 38 parts to about 50 parts by weight methacrylic acid.

9. The impact resistant graft polymer of claim 8 wherein the polymerized polymeric additive (B) latex has a particle diameter range from about 140 nm. to about 300 nm.

10. The impact resistant graft polymer of claim 9 wherein the agglomerated rubber (C) latex is comprised of about 0.1 to about 3.8 parts by weight of the polymerized polymeric additive (B), per 100 parts by weight of synthetic rubber (A).

11. The impact resistant graft polymer of claim 10 wherein the grafted polymer (D) comprises from about 5 to about 30 parts by weight of butyl acrylate or hydroxyethyl methacrylate, and from about 70 to about 95 parts by weight methyl methacrylate.

12. The impact resistant graft polymer of claim 10 wherein the grafted polymer (D) comprises about 50 parts by weight of styrene, from about 25 to about 40 by weight methyl methacrylate, and from about 10 to about 25 parts by weight ethyl acrylate.

13. The process of claim 4 wherein the synthetic rubber (A) latex is a butadiene-styrene copolymer comprised of from about 70 to about 95% by weight of butadiene, and from about 5 to about 30% by weight of styrene, and has a particle size distribution ranging from about 60 nm. to about 100 nm.

14. The process of claim 13 wherein the polymerized polymeric additive latex (B) is formed from about greater than 30 parts to about 50 parts by weight unsaturated carboxylic acid, from about 40 to about 60 parts by weight methyl methacrylate, and from about 0.1 parts to about 10 parts by weight butyl acrylate.

15. The process of claim 14 wherein the polymerized polymeric additive (B) latex has a particle diameter range from about 140 nm. to about 300 nm., and a pH from about 2.5 to about 4.0.

16. The process of claim 15 wherein the agglomerated rubber (C) latex is comprised of about 0.1 to about 3.8 parts by weight of the polymerized polymeric additive (B), per 100 parts by weight of synthetic rubber (A).

17. A polymer product comprising a polymer matrix and the impact resistant graft copolymer of claim 1.

18. The polymer product of claim 17 wherein the polymer matrix is a polyamide, poly(p-phenylene sulfide, polysulfone, polyarylate, polystyrene, poly(ether imide), polyimide, poly(glutanmide), poly(phenylene ether), aromatic polyester, polycarbonate, polymethyl methacrylate, styrene-acrylonitrile copolymer, polyvinyl chloride, polypropylene, or mixtures thereof.

19. An article prepared from the polymer product of claim 18.

* * * * *